United States Patent
Yang

(10) Patent No.: US 12,454,997 B2
(45) Date of Patent: Oct. 28, 2025

(54) DISCONNECTOR APPARATUS

(71) Applicant: Hyundai Transys Inc., Seosan-si (KR)

(72) Inventor: Se Dong Yang, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 0 days.

(21) Appl. No.: 18/659,066

(22) Filed: May 9, 2024

(65) Prior Publication Data

US 2024/0408960 A1    Dec. 12, 2024

(30) Foreign Application Priority Data

Jun. 7, 2023 (KR) .................. 10-2023-0072987

(51) Int. Cl.
| F16H 48/24 | (2006.01) |
| B60K 23/04 | (2006.01) |
| F16H 48/08 | (2006.01) |
| F16H 48/34 | (2012.01) |

(52) U.S. Cl.
CPC ............. *F16H 48/24* (2013.01); *F16H 48/08* (2013.01); *B60K 23/04* (2013.01); *F16H 2048/343* (2013.01)

(58) Field of Classification Search
CPC ............... F16H 48/08–2048/087; B60K 23/04
See application file for complete search history.

(56) References Cited

U.S. PATENT DOCUMENTS

| 8,851,212 B2 * | 10/2014 | Kahl ................. B60K 17/36 |
| | | 475/221 |
| 9,784,355 B1 * | 10/2017 | Brammer ............. B60K 23/08 |
| 11,098,794 B2 * | 8/2021 | Yudell .................. F16H 48/32 |
| 2025/0237298 A1 * | 7/2025 | Maurel ................ F16H 48/30 |

FOREIGN PATENT DOCUMENTS

| DE | 68905684 T2 | 7/1993 |
| DE | 112017004344 B4 | 12/2023 |
| JP | S52-097499 A | 2/1979 |
| JP | S61-175125 A | 8/1986 |
| JP | 2007-333133 A | 12/2007 |
| JP | 2022-187959 A | 12/2022 |
| KR | 10-1758210 B1 | 7/2017 |
| KR | 10-2017-0123869 A | 11/2017 |
| KR | 20210099429 A * | 8/2021 |
| KR | 10-2022-0159660 A | 12/2022 |
| WO | WO-2023198803 A1 * | 10/2023 ............. F16H 48/08 |

OTHER PUBLICATIONS

Examiner, "Office Action of corresponding German patent application No. 102024115465.9" issued on Mar. 25, 2025, Germany.

* cited by examiner

*Primary Examiner* — James J Taylor, II

(74) *Attorney, Agent, or Firm* — Bridgeway IP Law Group, PLLC; Jihun Kim

(57) ABSTRACT

Provided is a disconnector apparatus including a casing having therein a support ring and one side gear, one side gear engaging with a pinion gear in the support ring, a first clutch ring connected to a sleeve and having a first clutch part provided at one side directed toward the support ring, and a second clutch ring inserted into the first clutch ring and having a second clutch part provided at one side directed toward one side gear, the second clutch ring having the other side outer-diameter portion to which the sleeve is coupled.

15 Claims, 6 Drawing Sheets

DISCONNECTOR APPARATUS

CROSS-REFERENCE TO RELATED APPLICATIONS

This application claims priority to and the benefit of Korean Patent Application No. 10-2023-0072987 filed in the Korean Intellectual Property Office on Jun. 7, 2023, the entire contents of which are incorporated herein by reference.

TECHNICAL FIELD

The present invention relates to a disconnector apparatus capable of switching power to four-wheel drive or two-wheel drive.

BACKGROUND ART

In general, a disconnector apparatus refers to an apparatus mounted in a differential assembly and capable of minimizing an unnecessary loss of power by switching between two-wheel drive (2WD) and four-wheel drive (4WD) by engaging or disengaging a differential shaft depending on a traveling situation.

The disconnector apparatus in the related art includes a differential assembly, a disconnector shaft connected to a right differential side gear provided in a differential casing, a disconnector hub connected to a right vehicle wheel, and a disconnector sleeve configured to allow or block the transmission of power between the disconnector shaft and the disconnector hub. When the disconnector sleeve simultaneously engages with a dog gear part of the disconnector shaft and a dog gear part of the disconnector hub, an input part such as a motor or engine and an output part such as a vehicle wheel are dynamically connected to each other, such that four-wheel drive (4WD) may be implemented. When the disconnector sleeve moves toward the disconnector hub and the dog gear part of the disconnector shaft and the dog gear part of the disconnector hub disengage from each other, the transmission of power between the input part such as the motor or engine and the output part such as the vehicle wheel is blocked, such that two-wheel drive (2WD) may be implemented.

However, in the disconnector apparatus in the related art, the overall length and space of the vehicle excessively increase because of the complicated operational structure in which the ball screw shaft, the fork, and the disconnector sleeve are operated in conjunction with one another by the operation of the motor, and the disconnector shaft and the disconnector hub are connected by an operation of the disconnector sleeve, which causes disadvantages in respect to the weight and mountability of the vehicle. Further, in the case of two-wheel drive implemented by disconnecting an auxiliary driving wheel of a four-wheel drive vehicle, the final gear is stopped as the rotation of the input part is stopped, and a high differential occurs, in which the differential pinion gear is rotated at high speed by the rotation of the left differential side gear when the vehicle travels straight at high speed in the state in which the disconnector shaft and the disconnector hub are disconnected. For this reason, noise and vibration occur.

Document of Related Art

Patent Document (Patent Document 1) Korean Patent Application Laid-Open No. 10-2017-0123869 (published on Nov. 9, 2017)

SUMMARY OF THE INVENTION

The present invention has been made in an effort to solve the above-mentioned problem, and an object of the present invention is to provide a disconnector apparatus, in which a first clutch part of a first clutch ring may engage with a third clutch part of a support ring by means of a first operation of a sleeve to implement four-wheel drive, or a second clutch part of a second clutch ring may engage with a fourth clutch part of one side gear by means of a second operation of the sleeve in a state in which the first clutch part and the third clutch part engage with each other to restrict a differential.

In order to achieve the above-mentioned object, the present invention provides a disconnector apparatus including: a casing having therein a support ring and one side gear, one side gear engaging with a pinion gear in the support ring; a first clutch ring connected to a sleeve and having a first clutch part provided at one side directed toward the support ring; and a second clutch ring inserted into the first clutch ring and having a second clutch part provided at one side directed toward one side gear, the second clutch ring having the other side outer-diameter portion to which the sleeve is coupled, in which the first clutch ring is pushed toward the support ring by a first operation of the sleeve by a first operation of an actuator device coupled to the sleeve, and the first clutch part engages with a third clutch part of the support ring, such that four-wheel drive is implemented.

In addition, in a state in which the first clutch part and the third clutch part engage with each other, the second clutch ring may be pushed toward one side gear by a second operation of the sleeve by a second operation of the actuator device, and the second clutch part may engage with a fourth clutch part of one side gear, such that a differential is restricted.

In addition, the first clutch ring may have a plurality of leg parts, the leg part may extend from the other side of the first clutch ring toward the sleeve, and an end of the leg part may be exposed to the outside through a through-hole of the casing and connected to a connection part of the sleeve.

In addition, during the first operation, the sleeve may move by a preset first stroke and push the first clutch ring toward the support ring, the first clutch part of the first clutch ring may engage with the third clutch part of the support ring, and one side pressing surface, which is directed toward the support ring, may come into contact with a stepped portion provided on the other side outer-diameter portion of the second clutch ring.

In addition, during a second operation, the sleeve may move by a preset second stroke, the pressing surface may push the stepped portion toward one side gear in a state in which the pressing surface is in contact with the stepped portion, such that the second clutch part of the second clutch ring engages with the fourth clutch part of one side gear.

In addition, the stepped portion may have an insertion groove into which the connection part of the sleeve is inserted.

In addition, a first elastic member may be provided between the connection part of the sleeve and a catching portion provided on an outer-diameter portion of the second clutch ring.

In addition, the first elastic member may be compressed by being pressed by the connection part when the sleeve moves in an engagement direction, and when a pressing force of the sleeve is eliminated, the first elastic member may be stretched and move the sleeve in a disengagement direction.

In addition, the sleeve may be moved in the disengagement direction in a state in which the sleeve is caught by a stopper provided on the outer-diameter portion of the second clutch ring by an elastic force of the first elastic member.

In addition, the first clutch part, the second clutch part, the third clutch part, and the fourth clutch part may each be configured as a dog clutch.

In addition, the sleeve may be connected to a fork, and the fork may be provided on a transfer nut of the actuator device.

In addition, the actuator device may include: a housing; a motor coupled to the housing; and a ball screw shaft connected to the motor, the transfer nut may be coupled to the ball screw shaft and configured to be movable along the ball screw shaft while being guided by a guide rail mounted in the housing, and the fork may extend from the transfer nut toward the sleeve through an opening portion of the housing and be connected to the sleeve.

In addition, one side of the guide rail may be elastically supported by a second elastic member, one side of the second elastic member may be inserted into an accommodation hole of the housing, and the other side of the second elastic member may be assembled to be caught by a catching projection provided at one side of the guide rail.

In addition, the pinion gear may engage with the other side gear opposite to one side gear.

In addition, a coupling pin may be coupled to an outer-diameter portion of the support ring and penetrate a center of the pinion gear.

In addition, a fixing pin may be coupled to one side of the support ring and penetrate the coupling pin.

According to the present invention, the first clutch part of the first clutch ring may engage with the third clutch part of the support ring by the first operation of the sleeve, such that the four-wheel drive may be implemented.

In addition, according to the present invention, the second clutch part of the second clutch ring may engage with the fourth clutch part of one side gear in the state in which the first clutch part and the third clutch part engage with each other by the second operation of the sleeve, such that the differential may be restricted.

In addition, according to the present invention, when the auxiliary driving wheels coast in the two-wheel drive mode in accordance with the disengagement between the second clutch part and the fourth clutch part and the disengagement between the first clutch part and the second clutch part, the support ring, which supports the differential gear set including the two side gears and the four pinion gears, rotates, which makes it possible to solve the problem of noise caused by a high differential in the related art.

In addition, according to the present invention, the actuator device is modularized, which makes it possible to ensure assembly properties, facilitate repair, and reduce a defect rate.

In addition, the present invention may significantly reduce the overall length, thereby reducing the weight and greatly improving the packaging mountability.

In addition, the present invention may eliminate a component such as a disconnector shaft in the related art and reduce the number of components by modularizing the actuator device, which provides advantages in respect to spatial characteristics, weight, and costs.

In addition, the present invention may simplify the assembling process by modularizing the actuator device.

In addition, according to the present invention, because the actuator device is modularized, the actuator device may be mounted in any speed reducer as long as the space for mounting the first clutch ring and the support ring is ensured, which makes it possible to reduce the development period and provide high versatility.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
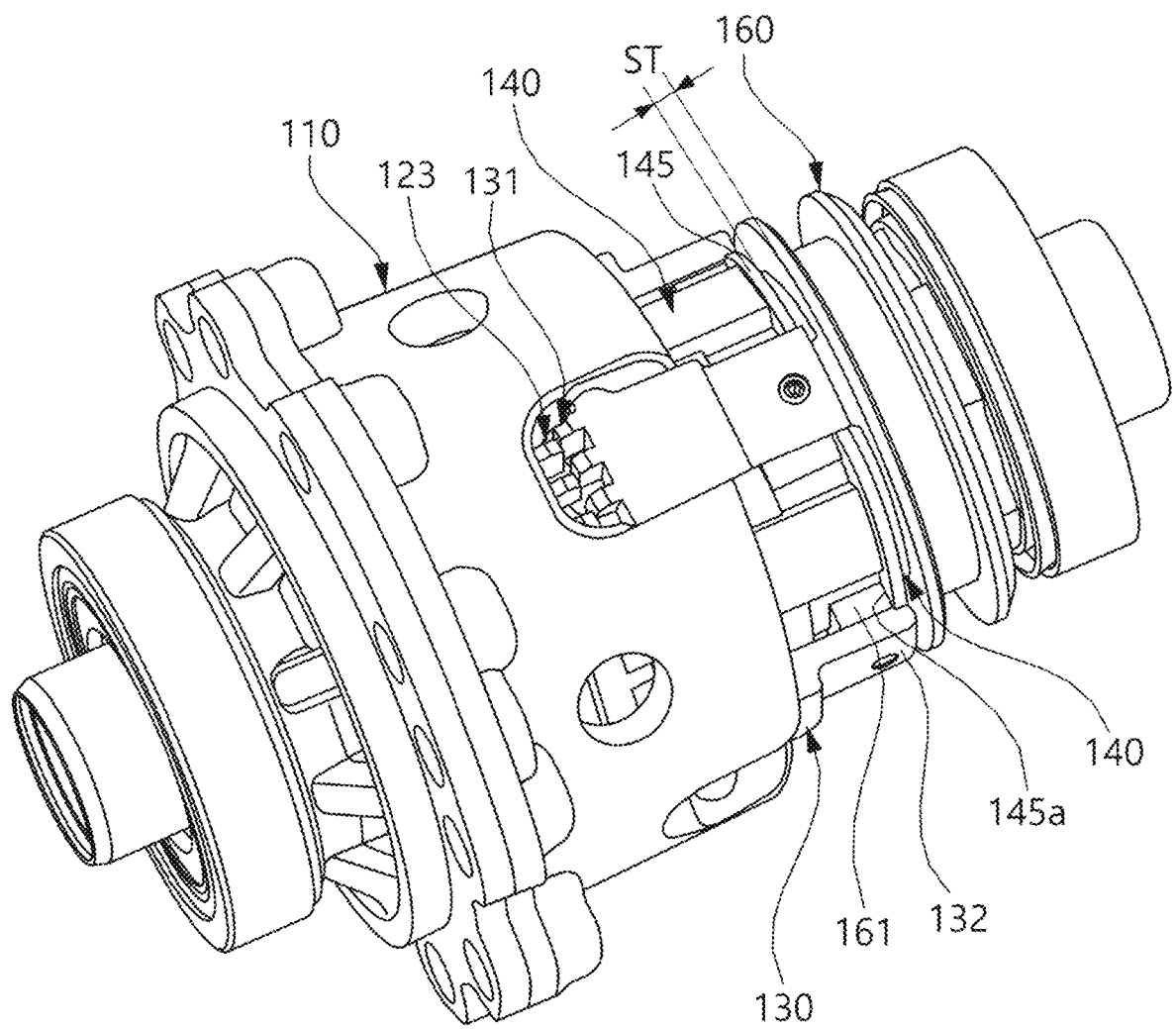
FIG. 1 is a perspective view of a disconnector apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

The present invention may be applied to electric vehicles (EV, battery electric vehicle), internal combustion engine (ICE) vehicles, hybrid electric vehicles (HEV), and the like.

Figure 2:
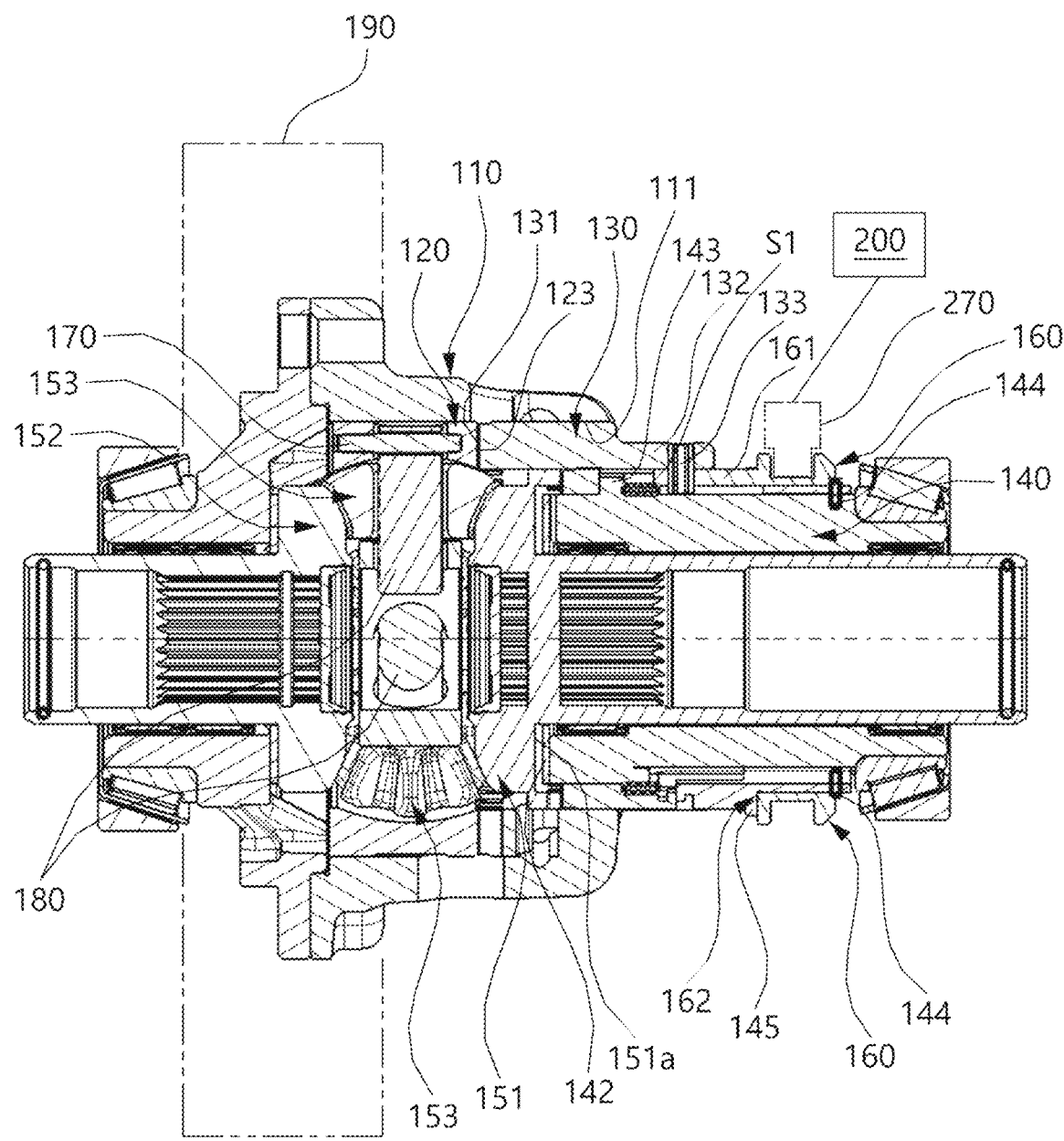
FIG. 2 is a cross-sectional side view of the disconnector apparatus according to the exemplary embodiment of the present invention.

FIG. 1 is a perspective view of a disconnector apparatus according to an exemplary embodiment of the present invention, and FIG. 2 is a cross-sectional side view of the disconnector apparatus according to the exemplary embodiment of the present invention.

As illustrated in FIGS. 1 and 2, the present invention includes a casing 110, a first clutch ring 130 for implementing four-wheel drive, and a second clutch ring 140 for implementing differential release.

A support ring 120, a pinion gear 153, and one side gear 151 and the other side gear 152, which engage with the pinion gear 153, may be mounted in the casing 110.

A part of the first clutch ring 130 may be coupled to an inner portion of the casing 110, and another part of the first clutch ring 130 may be exposed to the outside of the casing 110.

A power transmission member 190, such as a final gear or a reduction gear, may be coupled to an outer portion of the casing 110. Power of a power generation device (not illustrated), such as an engine or a drive motor, may be transmitted to the power transmission member 190. The power transmitted to the power transmission member 190 may be transmitted to the casing 110.

The first clutch ring 130 includes a first clutch part 131. The first clutch part 131 may be provided at one side directed toward the support ring 120 of the first clutch ring 130.

For example, the first clutch part 131 may be configured as a dog clutch.

The second clutch ring 140 may be inserted into the first clutch ring 130. The second clutch ring 140 includes a second clutch part 142. The second clutch part 142 may be provided at one side directed toward one side gear 151 of the second clutch ring 140.

For example, the second clutch part 142 may be configured as a dog clutch.

The first clutch part 131 may engage with a third clutch part 123 provided at one side of the support ring 120. The second clutch part 142 may engage with a fourth clutch part 151a provided at one side of one side gear 151.

For example, the third clutch part 123 and the fourth clutch part 151a may each be configured as a dog clutch.

The first clutch ring 130 may have a plurality of leg parts 132. The leg part 132 may extend toward a sleeve 160 from the other side of the first clutch ring 130. An end of the leg part 132 may be exposed to the outside through a through-hole 111 of the casing 110. The end of the leg part 132 may be connected to a connection part 161 of the sleeve 160.

For example, four leg parts 132 may be formed at equal intervals about the first clutch ring 130 as a central axis.

For example, the leg part 132 may be connected to the connection part 161 of the sleeve 160 by a coupling member 133 such as a bolt. For example, the leg part 132 may be connected to the connection part 161 by welding.

An insertion groove 145a may be provided in a stepped portion 145 of the second clutch ring 140. The insertion groove 145a may be configured to conform to the plurality of leg parts 132 of the first clutch ring 130.

The connection part 161 of the sleeve 160 may be inserted into the insertion groove 145a. In a state in which the connection part 161 is inserted into the insertion groove 145a, the connection part 161 may stably operate while being guided by the insertion groove 145a.

A first elastic member S1 may be provided between the connection part 161 of the sleeve 160 and a catching portion 143 provided on an outer-diameter portion of the second clutch ring 140. For example, the first elastic member S1 may be a return spring.

The first elastic member S1 may be compressed by being pressed by the connection part 161 of the sleeve 160 when the sleeve 160 moves in an engagement direction relative to the support ring 120 and the like. When the pressing force of the sleeve 160 is eliminated, the first elastic member S1 may be stretched and move the sleeve 160 in a disengagement direction.

The sleeve 160 may move in the disengagement direction in a state in which the sleeve 160 is caught by a stopper 144 provided on the other side outer-diameter portion of the second clutch ring 140 by an elastic force of the first elastic member S1.

In the state in which the sleeve 160 is caught by the stopper 144, the sleeve 160 may be pushed in the disengagement direction by an elastic force of the first elastic member S1, such that the second clutch part 142 and the fourth clutch part 151a may disengage, and the first clutch part 131 and the third clutch part 123 may disengage.

The pinion gear 153 may be mounted in the support ring 120. The pinion gear 153 may engage with one side gear 151 and the other side gear 152 opposite to one side gear 151.

A coupling pin 180 may be coupled to the outer-diameter portion of the support ring 120 and penetrate a center of the pinion gear 153. A fixing pin 170 may be coupled at one side of the support ring 120 and penetrate the coupling pin 180.

Figure 3:
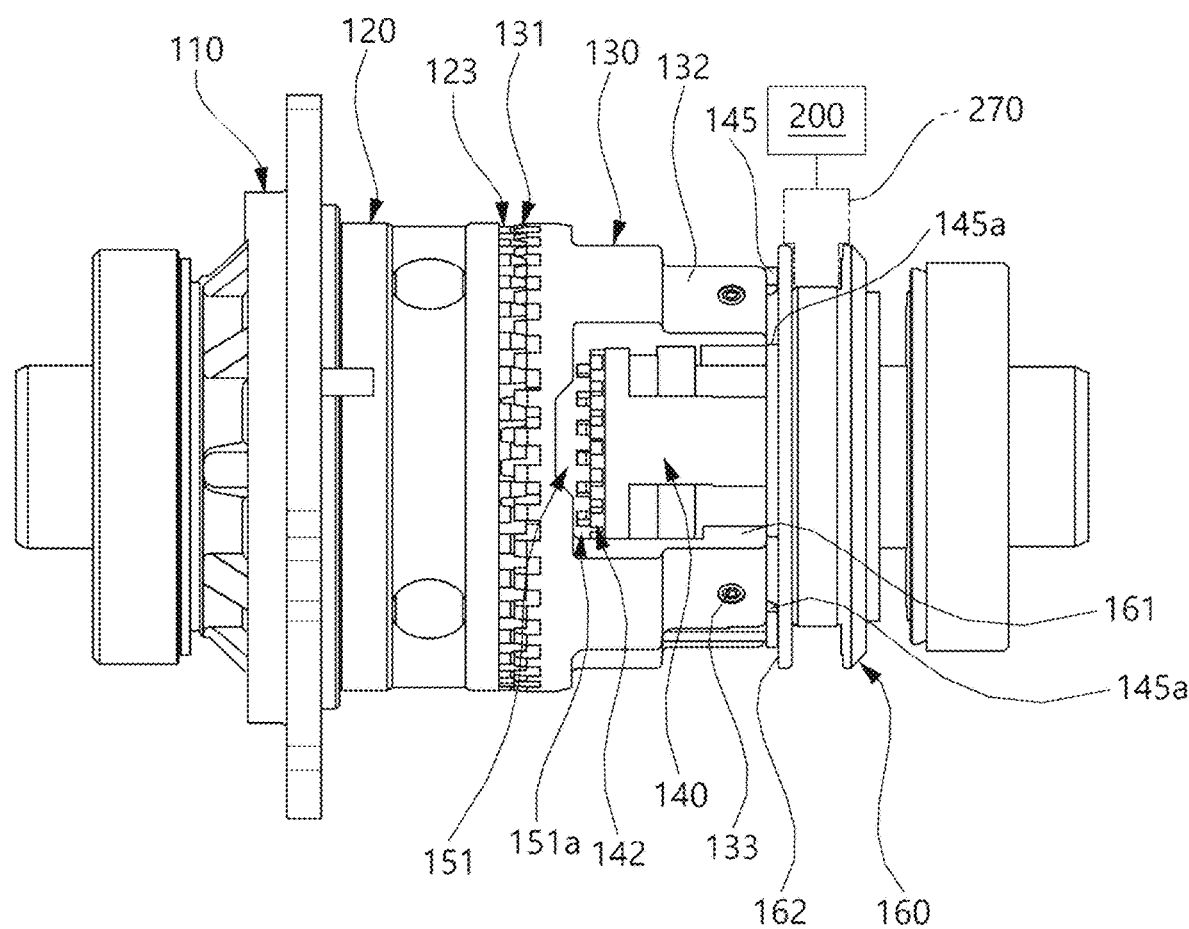
FIG. 3 is a view illustrating a state in which a first clutch part engages with a third clutch part in the case of four-wheel drive according to the exemplary embodiment of the present invention.

FIG. 3 is a view illustrating a state in which the first clutch part engages with the third clutch part in the case of four-wheel drive according to the exemplary embodiment of the present invention.

As illustrated in FIGS. 1 and 3, a first operation of the sleeve 160 may be performed by a first operation of an actuator device 200.

During the first operation, the sleeve 160 may move by a preset first stroke ST and push the first clutch ring 130 toward the support ring 120, such that the first clutch part 131 of the first clutch ring 130 may engage with the third clutch part 123 of the support ring 120. Therefore, the four-wheel drive may be implemented.

At the same time, a pressing surface 162 of the sleeve 160, which is directed toward the support ring 120, may come into contact with the stepped portion 145 provided on the other side outer-diameter portion of the second clutch ring 140.

Figure 4:
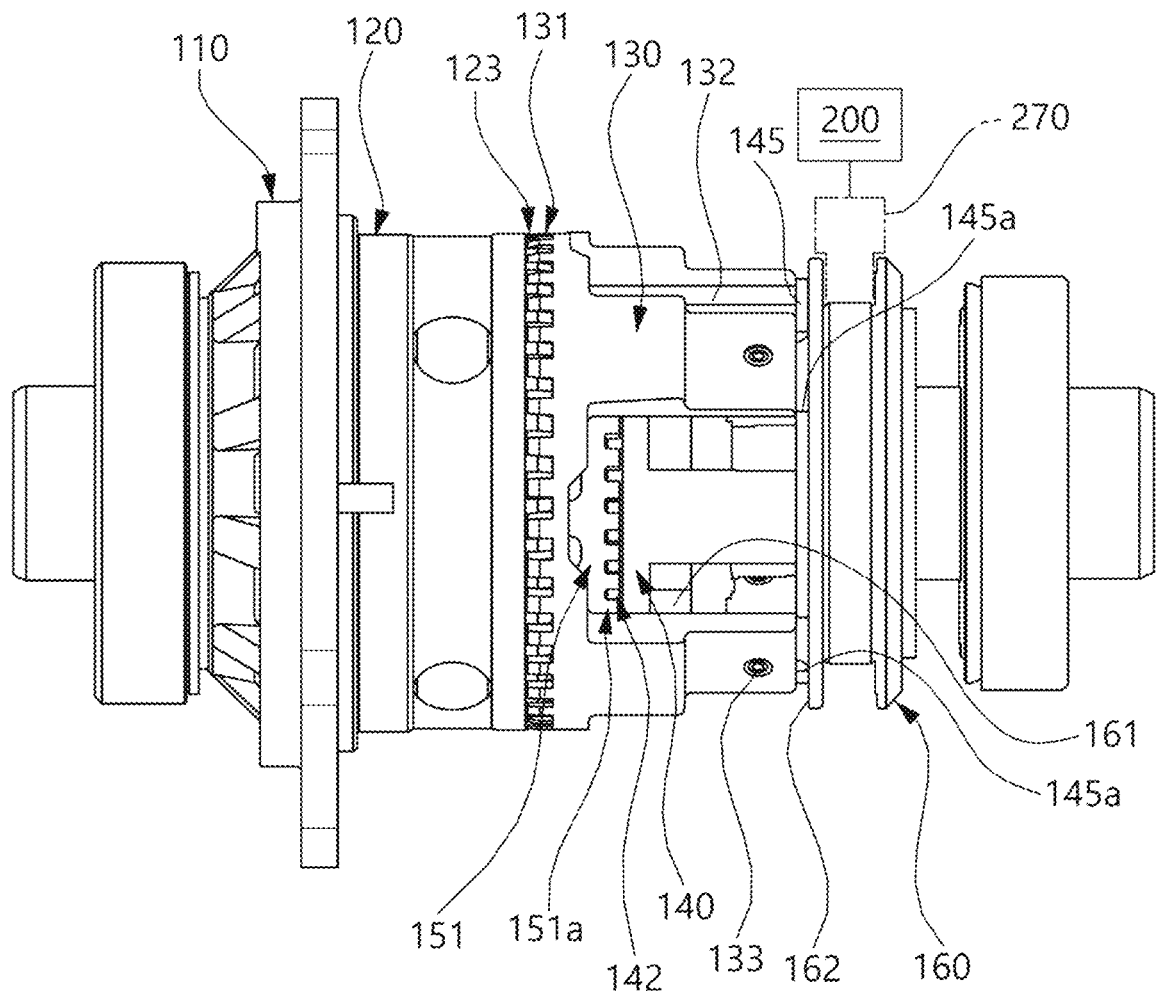
FIG. 4 is a view illustrating a state in which a second clutch part engages with a fourth clutch part in a state in which the first clutch part engages with the third clutch part in the case of differential release according to the exemplary embodiment of the present invention.

FIG. 4 is a view illustrating a state in which the second clutch part engages with the fourth clutch part in a state in which the first clutch part engages with the third clutch part in the case of differential release according to the exemplary embodiment of the present invention.

As illustrated in FIG. 4, a second operation of the sleeve 160 may be performed by a second operation of the actuator device 200.

During the second operation, the sleeve 160 may move by a preset second stroke and push the stepped portion 145 toward one side gear 151 in the state in which the pressing surface 162 is in contact with the stepped portion 145, such that the second clutch part 142 of the second clutch ring 140 may engage with the fourth clutch part 151a of one side gear 151. Therefore, the differential may be restricted.

Figure 6:
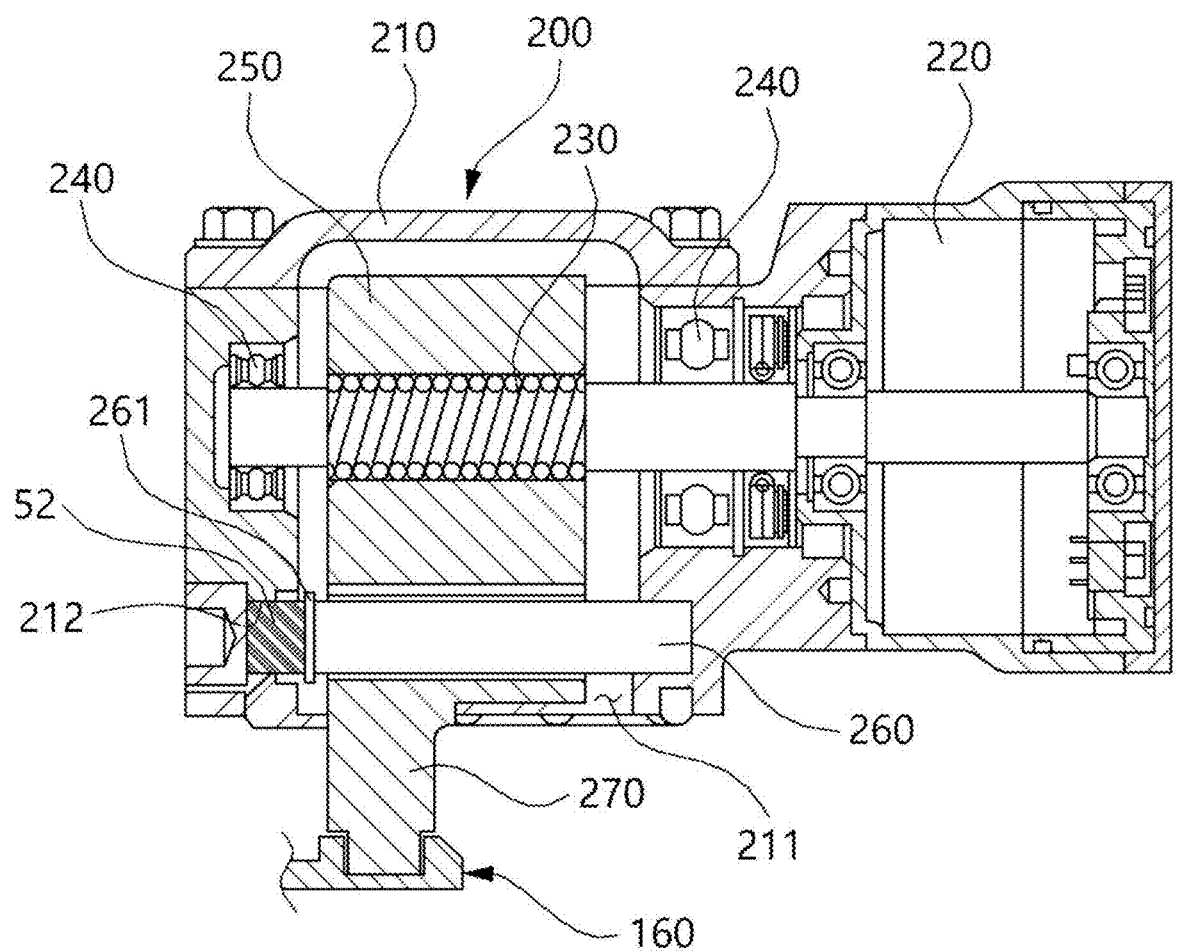
FIG. 6 is a view illustrating an actuator device according to the exemplary embodiment of the present invention.

FIG. 6 is a view illustrating the actuator device according to the exemplary embodiment of the present invention.

As illustrated in FIGS. 2 and 6, the sleeve 160 may be connected to a fork 270. The fork 270 may be provided on a transfer nut 250 of an actuator device 200.

The actuator device 200 may include a housing 210, a motor 220, and a ball screw shaft 230. The motor 220 may be coupled to the housing 210. The ball screw shaft 230 may be connected to the motor 220 and configured to be rotated by an operation of the motor 220.

The ball screw shaft 230 may be rotatably supported in the housing 210 by means of a support member 240 such as a bearing.

The transfer nut 250 may be provided in the housing 210. The transfer nut 250 may be coupled to the ball screw shaft 230. When the ball screw shaft 230 rotates, the transfer nut 250 may move along the ball screw shaft 230 while being guided by a guide rail 260 mounted in the housing 210.

A second elastic member S2 may be coupled to one side of the guide rail 260. For example, the second elastic member S2 may be a return spring. The second elastic member S2 may elastically support the guide rail 260.

One side of the second elastic member S2 may be inserted into an accommodation hole 212 of the housing 210.

The other side of the second elastic member S2 may be assembled to be caught by a catching projection 261 provided at one side of the guide rail 260.

The fork 270 may extend in a direction from the transfer nut 250 toward the sleeve 160 through an opening portion 211 of the housing 210. The fork 270 may be connected to the sleeve 160.

Next, an operation in the case of four-wheel drive of the present invention will be described.

As illustrated in FIGS. 1 and 3, when the ball screw shaft 230 is rotated by the operation of the motor 220 of the actuator device 200, the transfer nut 250 may move.

When the transfer nut 250 moves, the fork 270 integrated with the transfer nut 250 may move the sleeve 160.

The sleeve 160 may move by the first stroke ST while performing the first operation by the first operation of the actuator device 200.

When the sleeve 160 moves by the first stroke ST while performing the first operation, the first clutch ring 130 may move toward the support ring 120 by being pushed by the sleeve 160.

When the first clutch ring 130 moves toward the support ring 120, the first clutch part 131 of the first clutch ring 130 may engage with the third clutch part 123 of the support ring 120. Therefore, the four-wheel drive (4WD) may be implemented.

In this case, the pressing surface 162 of the sleeve 160, which is directed toward the support ring 120, may come into contact with the stepped portion 145 of the second clutch ring 140.

In the case of the four-wheel drive, the power of the power generation device (not illustrated), such as the engine or the drive motor, may be transmitted to the power transmission member 190.

The power of the power generation device may be transmitted to the casing 110 via the power transmission member 190. The support ring 120 may rotate as the casing 110 rotates. The support ring 120 may be coupled to the first clutch ring 130 and rotate together with the casing 110.

When the support ring 120 rotates together with the casing 110, the power may be transmitted to one side gear 151 and the other side gear 152 that engage with the pinion gear 153, such that one side gear 151 and the other side gear 152 may rotate.

When one side gear 151 and the other side gear 152 rotate, the power may be transmitted to two opposite auxiliary driving wheels (not illustrated) connected to one side gear 151 and the other side gear 152, such that the two opposite auxiliary driving wheels may rotate. Therefore, the four-wheel drive may be implemented as the power of the power transmission device is transmitted to the auxiliary driving wheels as well as main driving wheels (not illustrated).

Next, an operation in the case of differential release of the present invention will be described.

As illustrated in FIGS. 2 and 4, in the state in which the first clutch part 131 engages with the third clutch part 123 and the pressing surface 162 of the sleeve 160 is in contact with the stepped portion 145 of the second clutch ring 140, the sleeve 160 may move by the second stroke while performing the second operation by the second operation of the actuator device 200.

When the sleeve 160 moves by the second stroke while performing the second operation, the pressing surface 162 may push the stepped portion 145 toward one side gear 151, such that the second clutch part 142 of the second clutch ring 140 may engage with the fourth clutch part 151a of one side gear 151. Therefore, the differential may be restricted.

For example, in case that one driving wheel of a vehicle is placed on a rough road, such as a bog, in a differential driving state, rotational resistances applied to the left and right driving wheels become different. For this reason, a relative difference in speeds between one side gear 151 and the other side gear 152 occurs, and the driving wheel placed in the rough road idles, which makes it impossible for the driving wheel to escape from the rough road.

However, in the present invention, in a differential restriction state in which the first clutch part 131 engages with the third clutch part 123 and the second clutch part 142 engages with the fourth clutch part 151a, one side gear 151 and the other side gear 152 rotate at the same speed, such that one driving wheel may escape from a rough road even though the driving wheel is placed in the rough road such as a bog.

Next, an operation in the case of two-wheel drive of the present invention will be described.

Figure 5:
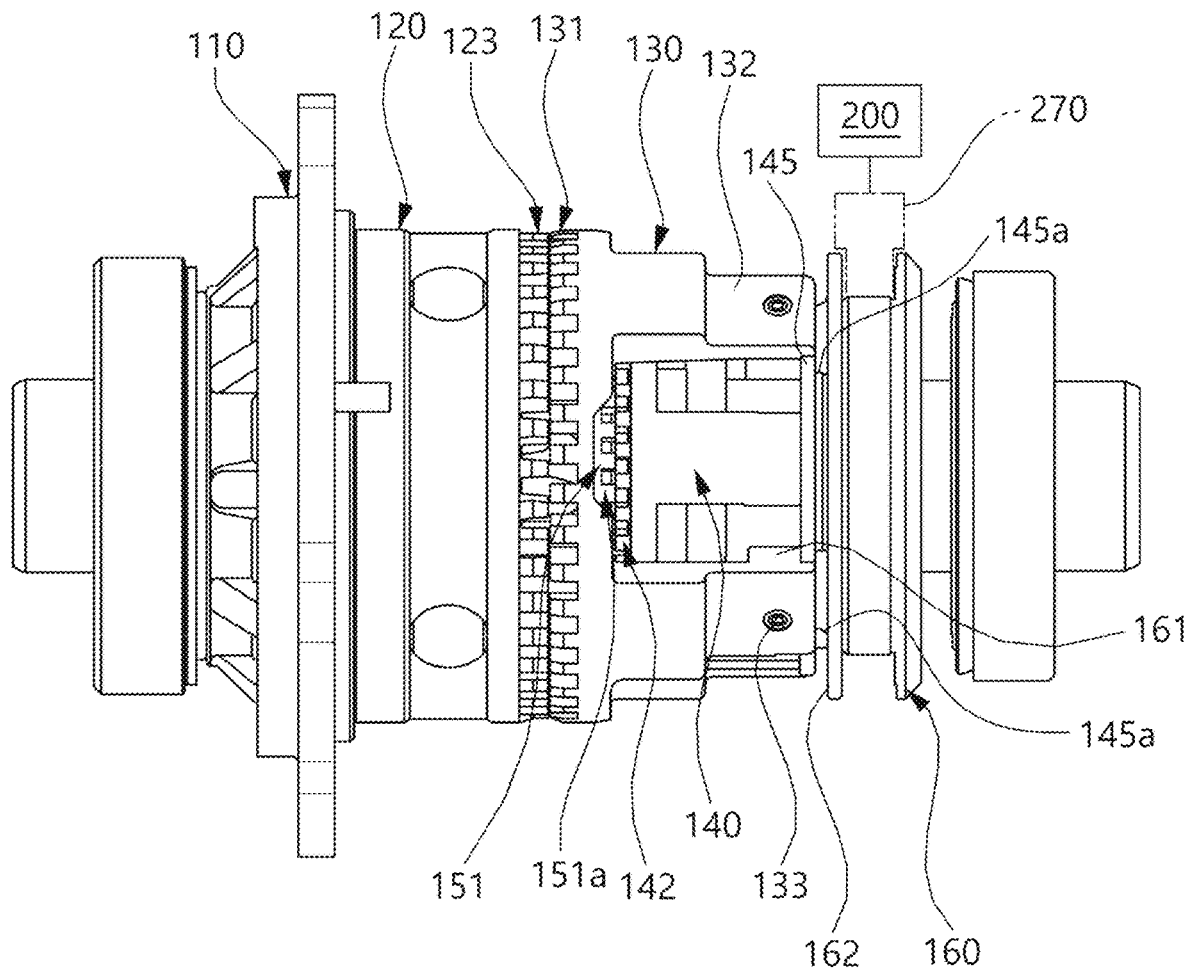
FIG. 5 is a view illustrating a state in which the second clutch part and the fourth clutch part disengage and a state in which the first clutch part and the third clutch part disengage in the case of two-wheel drive according to the exemplary embodiment of the present invention.

FIG. 5 is a view illustrating a state in which the second clutch part and the fourth clutch part disengage and a state in which the first clutch part and the third clutch part disengage in the case of two-wheel drive according to the exemplary embodiment of the present invention.

As illustrated in FIGS. 2, 5, and 6, the first elastic member S1, which has been compressed when the first clutch part 131 and the third clutch part 123 have engaged and the second clutch part 142 and the fourth clutch part 151a have engaged, may be stretched to the original state when the pressing force of the sleeve 160 is eliminated, such that the first elastic member S1 may move the sleeve 160 in the disengagement direction.

When the sleeve 160 is moved in the disengagement direction by the elastic force of the first elastic member S1, the second clutch part 142 and the fourth clutch part 151a may disengage, and the first clutch part 131 and the third clutch part 123 may disengage. Therefore, the two-wheel drive (2WD) may be implemented.

As another embodiment, the two-wheel drive may also be performed by the disengagement of the actuator device 200.

Specifically, when the ball screw shaft 230 is rotated by the operation of the motor 220 of the actuator device 200, the transfer nut 250 may move in the disengagement direction.

When the transfer nut 250 moves in the disengagement direction, the fork 270 integrated with the transfer nut 250 may move the sleeve 160 in the disengagement direction.

When the sleeve 160 is moved in the disengagement direction, the second clutch part 142 and the fourth clutch part 151a may disengage, and the first clutch part 131 and the third clutch part 123 may disengage. The first elastic member S1 may assist in moving the sleeve 160 in the disengagement direction.

In the state in which the second clutch part 142 and the fourth clutch part 151a disengage and the first clutch part 131 and the third clutch part 123 disengage, the power of the power generation device (not illustrated), such as the engine or the drive motor, is cut off, such that the power of the power generation device is not transmitted to the power transmission member 190.

The two opposite auxiliary driving wheels (not illustrated) may coast, and the rotational forces of the two opposite auxiliary driving wheels are transmitted to one side gear 151 and the other side gear 152, such that one side gear 151 and the other side gear 152 may rotate.

Because one side gear 151 and the other side gear 152 rotate in the state in which one side gear 151 and the other side gear 152 engage with the pinion gear 153, the support ring 120 may also rotate together with one side gear 151 and the other side gear 152.

In this case, the support ring 120 may freely rotate in the casing 110 in the state in which the support ring 120 disengages from the first clutch ring 130. Therefore, the two-wheel drive in which only the main driving wheels drive the vehicle and the auxiliary driving wheels coast may be implemented.

For example, because the electric vehicle travels at a high rotational speed, high differential noise may certainly occur. However, the present invention may solve the problem of the occurrence of high differential noise in the related art because the support ring 120 rotates in the casing 110.

For example, for convenience, the operation of the actuator device 200 and the operation of the sleeve 160 are classified as the first operation and the second operation. However, the first and second operations of the actuator device 200 and the sleeve 160 may be implemented as a single operation without being disconnected.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A disconnector apparatus comprising:
    a casing having a support ring and a one side gear, the one side gear being configured to engage with a pinion gear disposed in the support ring;
    a first clutch ring connected to a sleeve and having a first clutch disposed at one side of the first clutch ring facing the support ring; and
    a second clutch ring disposed in the first clutch ring and having a second clutch disposed at one side of the second clutch ring facing the one side gear, the second clutch ring having an outer-diameter portion at another side of the second clutch ring to which the sleeve is coupled,
    wherein the first clutch ring is configured to be pushed toward the support ring by a first operation of the sleeve by a first operation of an actuator coupled to the sleeve, and the first clutch is configured to engage with a third clutch of the support ring to implement four-wheel drive, and
    wherein the first clutch ring has a plurality of legs extending from another side of the first clutch ring toward the sleeve, and an end of each of the plurality of legs is disposed outside through a through-hole of the casing and connected to a connection part of the sleeve.

2. The disconnector apparatus of claim 1, wherein in a state in which the first clutch and the third clutch engage with each other, the second clutch ring is configured to be pushed toward the one side gear by a second operation of the sleeve by a second operation of the actuator, and the second clutch is configured to engage with a fourth clutch of the one side gear to restrict a differential.

3. The disconnector apparatus of claim 2, wherein the first clutch, the second clutch, the third clutch, and the fourth clutch are dog clutches.

4. The disconnector apparatus of claim 1, wherein during the first operation of the sleeve, the sleeve is configured to move by a preset first stroke and to push the first clutch ring toward the support ring to engage the first clutch of the first clutch ring with the third clutch of the support ring, and a pressing surface of the sleeve, which is facing the support ring, is configured to come into contact with a stepped portion disposed on the outer-diameter portion of the another side of the second clutch ring.

5. The disconnector apparatus of claim 4, wherein during a second operation of the sleeve, the sleeve is configured to move by a preset second stroke, the pressing surface is configured to push the stepped portion toward the one side gear in a state in which the pressing surface is in contact with the stepped portion to engage the second clutch of the second clutch ring with a fourth clutch of the one side gear.

6. The disconnector apparatus of claim 5, wherein the stepped portion has an insertion groove configured to be inserted with the connection part of the sleeve.

7. The disconnector apparatus of claim 1, wherein a first elastic member is disposed between the connection part of the sleeve and a catching portion disposed on the outer-diameter portion of the second clutch ring.

8. The disconnector apparatus of claim 7, wherein the first elastic member is configured to be compressed by the connection part when the sleeve moves in an engagement direction, and wherein when a pressing force of the sleeve is eliminated, the first elastic member is configured to be stretched and to move the sleeve in a disengagement direction.

9. The disconnector apparatus of claim 8, wherein the sleeve is configured to be moved in the disengagement direction in a state in which the sleeve is caught by a stopper disposed on the outer-diameter portion of the second clutch ring by an elastic force of the first elastic member.

10. The disconnector apparatus of claim 1, wherein the sleeve is connected to a fork, and the fork is disposed on a transfer nut of the actuator.

11. The disconnector apparatus of claim 1, wherein the pinion gear is configured to engage with an other side gear opposite to the one side gear.

12. The disconnector apparatus of claim 11, wherein a coupling pin is coupled to an outer-diameter portion of the support ring and configured to penetrate a center of the pinion gear.

13. The disconnector apparatus of claim 12, wherein a fixing pin is coupled to one side of the support ring and configured to penetrate the coupling pin.

14. A disconnector apparatus comprising:
a casing having a support ring and a one side gear, the one side gear being configured to engage with a pinion gear disposed in the support ring;
a first clutch ring connected to a sleeve and having a first clutch disposed at one side of the first clutch ring facing the support ring; and
a second clutch ring disposed in the first clutch ring and having a second clutch disposed at one side of the second clutch ring facing the one side gear, the second clutch ring having an outer-diameter portion at another side of the second clutch ring to which the sleeve is coupled,
wherein the first clutch ring is configured to be pushed toward the support ring by a first operation of the sleeve by a first operation of an actuator coupled to the sleeve, and the first clutch is configured to engage with a third clutch of the support ring to implement four-wheel drive,
wherein the sleeve is connected to a fork, and the fork is disposed on a transfer nut of the actuator, and
wherein the actuator comprises:
a housing;
a motor coupled to the housing; and
a ball screw shaft connected to the motor,
wherein the transfer nut is coupled to the ball screw shaft and is movable along the ball screw shaft while being guided by a guide rail mounted in the housing, and
wherein the fork extends from the transfer nut toward the sleeve through an opening portion of the housing and is connected to the sleeve.

15. The disconnector apparatus of claim 14, wherein one side of the guide rail is elastically supported by a second elastic member, one side of the second elastic member is disposed in an accommodation hole of the housing, and another side of the second elastic member is caught by a catching projection disposed at the one side of the guide rail.

* * * * *